US009373040B2

(12) United States Patent
Sukthankar et al.

(10) Patent No.: US 9,373,040 B2
(45) Date of Patent: Jun. 21, 2016

(54) IMAGE MATCHING USING MOTION MANIFOLDS

(75) Inventors: Rahul Sukthankar, Orlando, FL (US); Jay Yagnik, Mountain View, CA (US)

(73) Assignee: Google Inc., Mountain View, CA (US)

( * ) Notice: Subject to any disclaimer, the term of this patent is extended or adjusted under 35 U.S.C. 154(b) by 609 days.

(21) Appl. No.: 13/346,662

(22) Filed: Jan. 9, 2012

(65) Prior Publication Data

US 2013/0108177 A1    May 2, 2013

Related U.S. Application Data

(60) Provisional application No. 61/554,244, filed on Nov. 1, 2011.

(51) Int. Cl.
*G06K 9/00* (2006.01)
*G06K 9/68* (2006.01)
*G06K 9/62* (2006.01)
*G06T 7/20* (2006.01)

(52) U.S. Cl.
CPC .......... *G06K 9/00758* (2013.01); *G06K 9/6215* (2013.01); *G06K 9/68* (2013.01); *G06T 7/204* (2013.01); *G06T 2207/30201* (2013.01); *G06T 2207/30241* (2013.01)

(58) Field of Classification Search
USPC ........................................................ 382/305
See application file for complete search history.

(56) References Cited

U.S. PATENT DOCUMENTS

| | | | | |
|---|---|---|---|---|
| 4,467,708 A * | 8/1984 | Twiford et al. | ............. | 99/450.8 |
| 4,948,111 A * | 8/1990 | Thomsen | ..................... | 270/59 |
| 6,081,606 A * | 6/2000 | Hansen et al. | ............... | 382/107 |
| 6,437,808 B1 * | 8/2002 | Brill et al. | ...................... | 715/765 |
| 6,628,805 B1 * | 9/2003 | Hansen et al. | ............... | 382/107 |
| 8,254,752 B2 * | 8/2012 | Ryu | .............................. | 386/241 |
| 8,463,050 B2 * | 6/2013 | Barlaud et al. | ............... | 382/219 |
| 2007/0052858 A1 | 3/2007 | Zhou et al. | | |
| 2007/0133840 A1 * | 6/2007 | Cilia | ............................ | 382/103 |
| 2009/0027502 A1 | 1/2009 | Yang | | |
| 2010/0054536 A1 * | 3/2010 | Huang et al. | .................. | 382/103 |
| 2010/0067803 A1 * | 3/2010 | Huang et al. | .................. | 382/195 |

(Continued)

FOREIGN PATENT DOCUMENTS

CN          101216888 A          7/2008

OTHER PUBLICATIONS

Wang, Liang, and David Suter. "Learning and Matching of Dynamic Shape Manifolds for Human Action Recognition." IEEE Transactions on Image Processing 16.6 (2007) p. 1646-1661.*

(Continued)

*Primary Examiner* — Ishrat I Sherali
(74) *Attorney, Agent, or Firm* — Fenwick & West LLP (57) ABSTRACT

A motion manifold system analyzes a set of videos, identifying image patches within those videos corresponding to regions of interest and identifying patch trajectories by tracking the movement of the regions over time in the videos. Based on the patch identification and tracking, the system produces a motion manifold data structure that captures the way in which the same semantic region can have different visual representations over time. The motion manifold can then be applied to determine the semantic similarity between different patches, or between higher-level constructs such as images or video segments, including detecting semantic similarity between patches or other constructs that are visually dissimilar.

24 Claims, 5 Drawing Sheets

(56) References Cited

U.S. PATENT DOCUMENTS

2011/0279652 A1* 11/2011 Eggert et al. ............... 348/47
2013/0108177 A1* 5/2013 Sukthankar et al. ......... 382/218
2013/0182894 A1* 7/2013 Kim et al. .................... 382/103

OTHER PUBLICATIONS

Sugimura et al. "Using Individuality to Track Individuals: Clustering Individual Trajectories in Crowds using Local Appearance and Frequency Trait", 2009 IEEE 12th International Conference on Computer Vision (ICCV), p. 1467-1474.*

Sun et al. Motion Retrieval Using Low-Rank Subspace Decomposition of Motion, Computer Graphics Forum, vol. 30, Issue 7, Sep. 2011, pp. 1953-1962.*

Datta, A., et al., "Modeling the Product Manifold of Posture and Motion" Second IEEE International Workshop on Tracking Humans for the Evaluation of their Motion in Image Sequences (THEMIS) Oct. 2009, 8 pages.

Lee Chan-Su et al. "Human Motion Synthesis by Motion Manifold Learning and Motion Primitive Segmentation" Conference on Articulated Motion and Deformable Objects (AMDO), Jul. 11-14, 2006, pp. 464-473.

Nascimento, J.C. et al., "Manifold Learning for Object Tracking with Multiple Motion Dynamics" Proceedings of the 11th European conference on computer vision conference on Computer vision (ECCV'IO): Part III, Berlin, Heidelberg: Springer-Verlag, Lecture Notes in Computer Science 6313, 2010, pp. 172-185.

PCT International Search Report and Written Opinion, PCT/US2012/061651, Feb. 28, 2013, 8 Pages.

Office Action for Chinese Patent Application No. CN 2012800611076, Jan. 12, 2015, 21 Pages.

* cited by examiner

IMAGE MATCHING USING MOTION MANIFOLDS

CROSS REFERENCE TO RELATED APPLICATIONS

The application claims the benefit of Provisional Application No. 61/554,244, filed on Nov. 1, 2011, which is hereby incorporated herein by reference.

BACKGROUND

1. Field of Art

The present disclosure generally relates to the field of digital video, and more specifically, to methods of determining the semantic similarity of two images or portions thereof.

2. Background of the Disclosure

Automated analysis of images and videos has a number of useful applications. As one example, the ability to quantify the semantic similarity of images or objects therein would allow a user to search for images or videos similar to an image or video presently being viewed, or a system to identify a particular object across time within a video despite a change in its visual appearance.

However, conventional techniques rely on the existence of consistent visual similarity when comparing two visual objects or tracking an object over time. Although such techniques can be applied to objects with a consistent visual representation, they perform poorly in the case of objects that can deform (such as bursting balloons, or eyes that open and close over time), objects that are capable of articulated motion (such as people or animals), and other types of objects that can dramatically change their visual appearance over time.

SUMMARY

One embodiment of a computer-implemented method comprises identifying semantic regions in a set of digital videos and identifying patch trajectories by tracking patches corresponding to the semantic regions across frames of the videos. The method further comprises creating a motion manifold using the patch trajectories, the motion manifold indicating, for ones of the semantic regions, different visual representations of the semantic region. The method further comprises storing the motion manifold.

Embodiments of a computer-readable storage medium have executable computer program embodied thereon for performing actions. The actions comprise identifying semantic regions of videos of a set of digital videos and identifying patch trajectories by tracking patches corresponding to the semantic regions across frames of the videos. The actions further comprise creating the motion manifold using the patch trajectories, the motion manifold indicating, for ones of the semantic regions, different visual representations of the semantic region, and storing the motion manifold.

In one embodiment, a computer system comprises a computer processor and a computer-readable medium having executable computer program instructions embodied therein. When executed by the computer processor, the instructions perform actions comprising identifying semantic regions of videos of a set of digital videos and identifying patch trajectories by tracking patches corresponding to the semantic regions across frames of the videos. The actions further comprise creating the motion manifold using the patch trajectories, the motion manifold indicating, for ones of the semantic regions, different visual representations of the semantic region, and storing the motion manifold.

One embodiment of a computer-implemented method comprises accessing a motion manifold that quantifies, for pairs of patch clusters comprising visually similar image patches, degrees of semantic similarity derived from analysis of transitions between patches of the patch clusters over the course of videos. The method further comprises determining a degree of semantic similarity between a first patch from a first visual element and a second patch from a second visual element using the motion manifold.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

The figures depict embodiments of the present disclosure for purposes of illustration only. One skilled in the art will readily recognize from the following description that alternative embodiments of the structures and methods illustrated herein may be employed without departing from the principles of the disclosure described herein.

DETAILED DESCRIPTION

System Architecture

Figure 1:
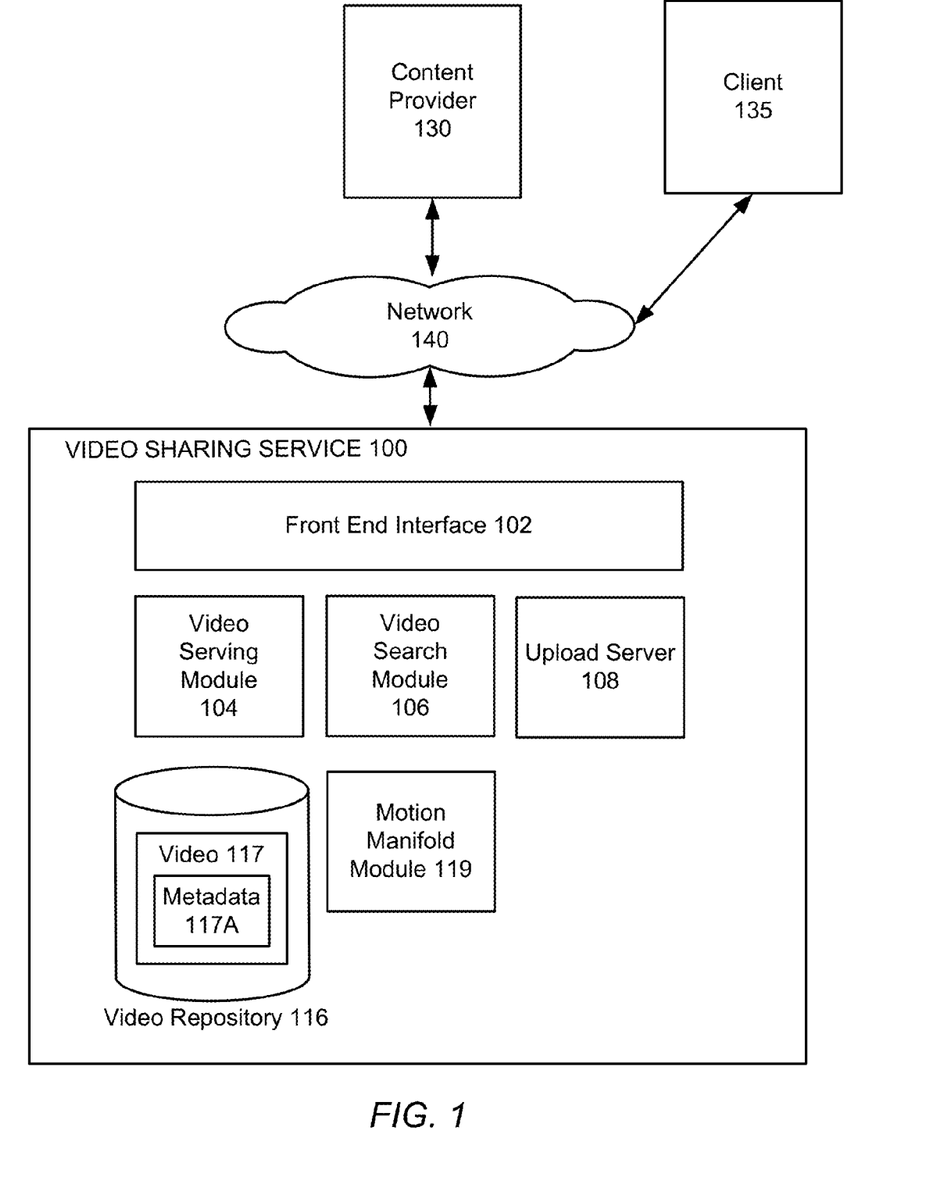
FIG. 1 is a block diagram of a video sharing service in which a motion manifold can be constructed, according to one embodiment.

FIG. 1 is a block diagram of an example video sharing service 100 in which classifier training can be employed, according to one embodiment. The video sharing service 100 represents a system such as that of YOUTUBE that stores videos provided by content providers 130 and makes the videos available to clients such as the client device 135. The video sharing service 100 thus communicates with a plurality of content providers 130 and client devices 135 via a network 140 to facilitate sharing of video content between users. Note that for the sake of clarity FIG. 1 depicts only one instance of content provider 130 and client device 135, though there could be any number of each.

The video sharing service 100 additionally includes a front end interface 102, a video serving module 104, a video search module 106, an upload server 108, and a video repository 116. Other conventional features, such as firewalls, load balancers, authentication servers, application servers, failover servers, site management tools, and so forth are not shown so as to more clearly illustrate the features of the video sharing service 100. One example of a suitable service 100 is the YOUTUBE website, found at www.youtube.com. Other video hosting sites are known, as well, and can be adapted to operate according to the teachings disclosed herein. The illustrated components of the video sharing service 100 can be implemented as single or multiple components of software or hardware. In general, functions described in one embodiment as being performed by one component can also be performed by other components in other embodiments, or by a combination of components. Furthermore, functions described in one embodiment as being performed by components of the video sharing service 100 can also be performed by one or more clients 135 in other embodiments if appropriate.

Client devices 135 are computing devices that execute client software, e.g., a web browser or built-in client application, to connect to the front end interface 102 of the video sharing service 100 via a network 140 and to display videos. The client device 135 might be, for example, a personal computer, a personal digital assistant, a smart phone, a laptop computer, a television "set-top box," and the like.

Conceptually, the content provider 130 provides video content to the video sharing service 100 and the client 135 views that content. In practice, content providers may also be content viewers. Additionally, the content provider 130 may be the same entity that operates the video sharing service 100.

The content provider 130 operates a client device to perform various content provider functions. Content provider functions may include, for example, uploading a video file to the video sharing service 100, editing a video file stored by the video sharing service 100, or editing content provider preferences associated with a video file.

The client 135 operates on a device to view video content stored by the video sharing service 100. Client 135 may also be used to configure viewer preferences related to video content. In some embodiments, the client 135 includes an embedded video player such as, for example, the FLASH player from Adobe Systems, Inc. or any other player adapted for the video file formats used in the video sharing service 100. Note that the terms "client" and "content provider" as used herein may refer to software providing client and content providing functionality, to hardware on which the software executes, or to the entities operating the software and/or hardware, as is apparent from the context in which the terms are used.

The upload server 108 of the video sharing service 100 receives video content from a client 135. Received content is stored in the video repository 116. In response to requests from clients 135, a video serving module 104 provides video data from the video repository 116 to the clients 135. Clients 135 may also search for videos of interest stored in the video repository 116 using a video search module 106, such as by entering textual queries containing keywords of interest. Front end interface 102 provides the interface between client 135 and the various components of the video sharing service 100.

The video repository 116 contains a set of videos 117 submitted by content providers 130. The video repository 116 can contain any number of videos 117, such as tens of thousands or hundreds of millions. Each of the videos 117 has a unique video identifier that distinguishes it from each of the other videos, such as a textual name (e.g., the string "a91qrx8"), an integer, or any other way of uniquely naming a video. The videos 117 can be packaged in various containers such as AVI, MP4, or MOV, and can be encoded using video codecs such as MPEG-2, MPEG-4, H.264, and the like. In addition to their audiovisual content, the videos 117 may further have associated metadata 117A, e.g., textual metadata such as a title, description, and/or tags provided by a content provider 130 who uploaded the video.

The video sharing service 100 further comprises a motion manifold module 119 that analyzes content within the videos 117 and creates a motion manifold data structure that captures the way in which the same logical object can visually vary over time. More specifically, the motion manifold module 119 tracks the movement and change of "patches"—image data corresponding to semantically meaningful regions of the image frames, such as entire objects (e.g., an eye) or individual points thereof (e.g., a point at the corner of the eye)—across consecutive frames of videos.

For example, consider a video of a person's face, showing the person's eyes and mouth. The visual appearance and properties of the eyes can change over the course of a video segment, such as becoming slightly larger or smaller as the camera zooms in and out, or changing from a closed state (i.e., the eyelid covering the eye) to an open state, and the location of the eye can change across image frames as the camera pans. Thus, the region representing the eye can not only change locations (e.g., due to the person turning his or her head), but can also change size (e.g., due to the person blinking) Similarly, the shape and size of the mouth changes moment by moment as the person is speaking. Associated with regions such as these are patches of image data representing the eyes and mouth, the size and location of which is tracked across frames. As another example, consider a video of a cat jumping. Here again the size and shape of regions associated with the cat are rapidly changing over the duration of the video. It should be noted that the patches need not correspond to objects that are necessarily discrete or complete, e.g., a patch may correspond to just a portion of a face, a cat, etc., or may correspond to events, such as explosions in a movie video.

Figure 2:
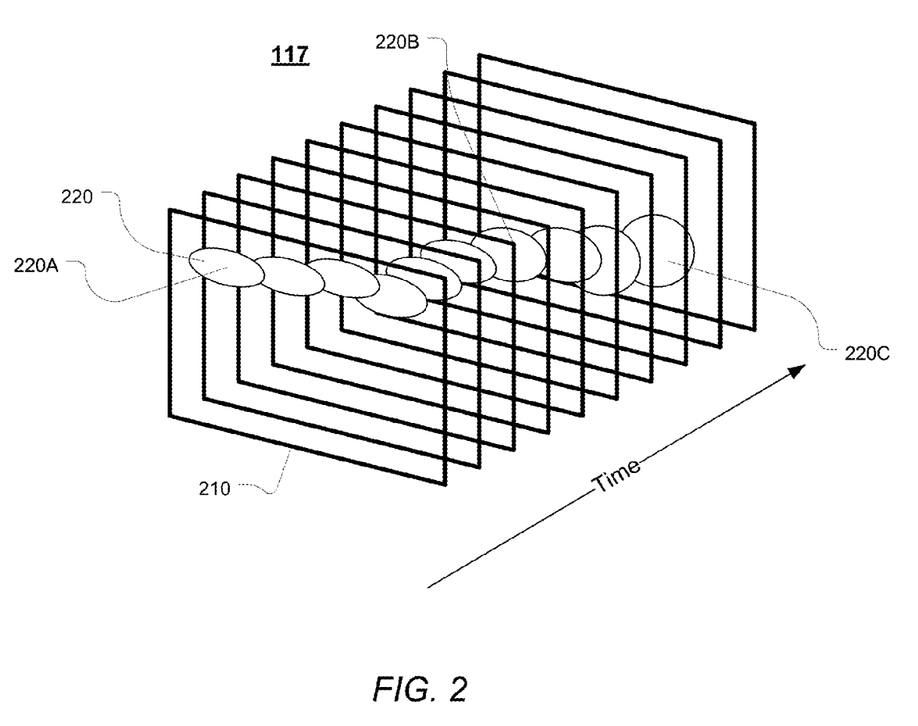
FIG. 2 illustrates the concept of a trajectory for a region over time.

A set of tracked patches corresponding to the same semantic region across time is referred to as a "trajectory." FIG. 2 illustrates the concept of a trajectory for a region over time. An example video 117 comprises a number of frames 210, a subset of which is depicted in FIG. 2. A trajectory 220 represents a set of logical regions displaying a particular object as it changes in position, size, and shape over the course of the video segment, and hence may be visualized as a volume having a spatial extent (e.g., an outline) in the plane of a frame, and a temporal extent over some number of consecutive frames. Specifically, the trajectory comprises a number of patches corresponding to the object, such as the ten patches illustrated in FIG. 2. In the first illustrated patch, 220A, the region is comparatively small, is considerably wider than it is tall, and is located in the upper-left of its frame. As the video progresses, by the seventh frame the patch 220B has become taller while retaining the same width, and is located further to the right and somewhat lower in its frame than patch 220A, The last illustrated patch, 220C, has grown even taller, thus approaching a circular shape, and has moved further down in the frame. It is appreciated that FIG. 2 is purely for purposes of example. In most cases a trajectory would have a duration greater than ten frames, for example.

Tracking allows observation of the different visual appearances that the same object assumes over time, such as the various positions that a cat assumes between standing and sitting, the various colors that a chameleon can assume while remaining stationary, or the various shapes of a popping balloon. The motion manifold module 119 of FIG. 1 then groups visually similar patches and forms a motion manifold data structure that captures the observed temporal transitions. Thus, the motion manifold represents how a patch may change its appearance over time for the same logical region. The motion manifold may be represented using different data structures, such as a graph, and/or an alternate representation of the graph, such as a matrix. The motion manifold can then be applied to quantify the semantic similarity of individual patches, or of more complex image structures containing patches, such as entire images or video segments.

Although depicted in FIG. 1 as being part of the video sharing service 100, in some embodiments the motion manifold module 119 may be separate from the video sharing service. For example the motion manifold module 119 may be located remotely from the video sharing service 100 and accessible via the network 140, and may be operated by an organization different from that operating the video sharing service. More generally, the motion manifold module 119 can be implemented in, or for, any system that provides a repository of stored videos.

Figure 3:
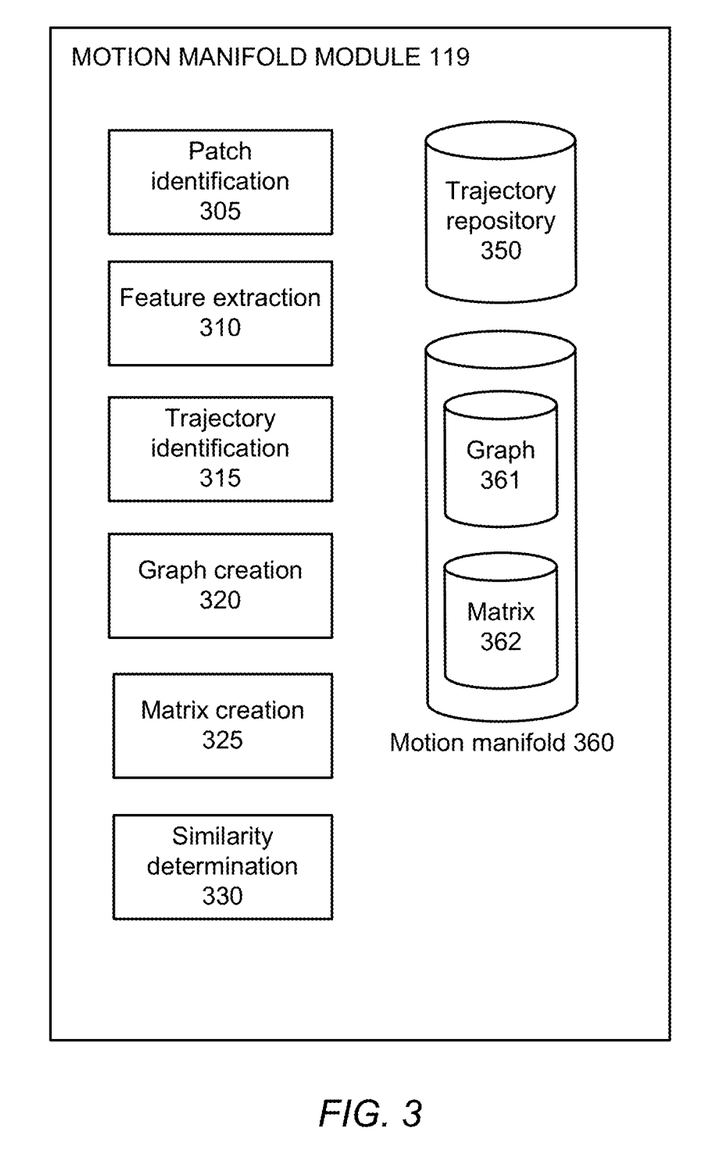
FIG. 3 illustrates the various components of a motion manifold module of FIG. 1, according to one embodiment.

FIG. 3 illustrates the various components of the motion manifold module 119, according to one embodiment. In this embodiment, the motion manifold module 119 comprises a patch identification module 305 that identifies the individual patches to be tracked. As noted above, patches represent semantically interesting regions of video images. The patch identification module 305 can use various different algorithms to identify patches, corresponding to various types of objects to be identified.

In some embodiments the patches correspond to a logical object as a whole, such as a human eye. In such embodiments, the patches for the objects are identified using object segmentation techniques such as adaptive background subtraction, spatial and temporal segmentation with clustering algorithms, or other algorithms known to those of skill in the art. In one embodiment, a mean shift algorithm is used, which employs clustering within a single frame of a video. In segmentation based on the mean shift algorithm, a frame is converted into tokens, e.g. by converting each pixel of the image into a corresponding value, such as color value, gradient value, texture measurement value, etc. Then windows are positioned uniformly around the data, and for each window the centroid—the mean location of the data values in the window—is computed, and each window re-centered around that point. This is repeated until the windows converge, i.e. a local center is found. The data traversed by windows that converged to the same point are then clustered together, producing a set of separate image regions.

In other embodiments, the patches correspond to individual points of larger objects, such as the inner corner of an eye. Techniques such as the Harris interest point operator are applied in some embodiments to find corner points and to track them across frames in the video.

The motion manifold module 119 further comprises a feature extraction module 310 that derives, for each identified patch, a corresponding set of features that characterize the patch. In one embodiment, the features are stored as a vector of values describing the visual appearance of the patch. The visual appearance features may include, for example, features sampled using a Laplacian-of-Gaussian (LoG) or Scale Invariant Feature Transform (SIFT) feature extractor, a color histogram computed using hue and saturation in HSV color space, motion rigidity features, texture features, or edge features using edges detected by a Canny edge detector. Other types of visual features would be known to one of skill in the art and may be used as well, such as feature descriptors including GLOH (Gradient Location and Orientation Histogram), LESH (Local Energy based Shape Histogram), HOG (Histogram of Oriented Gradients), or SURF (Speeded Up Robust Features) features.

The motion manifold module 119 further comprises a trajectory identification module 315 that tracks the different patches corresponding to each of the various visual regions of interest. (Regions of interest are hereinafter referred to as "semantic regions.") For example, the motion manifold module 119 can track a region of a video depicting the eye of a person throughout a contiguous portion of the video during which the person is present in the scene, identifying a number of regions of different frames in which the eye has different appearances, such as open, closed, or partially closed, and the like. By tracking the semantic region across consecutive frames, the trajectory identification module 315 can determine the different visual appearances nonetheless represent the same semantic region.

The tracking may be accomplished in different manners in different embodiments, as would be known to one of skill in the art. For example, a complex object such as an eye could be tracked using tracking algorithms such as contour tracking via the Conditional Density Propagation algorithm, kernel-based object tracking, or the like. Further, in some embodiments, the tracking need not be performed across every frame, but rather could be performed (for example) at fixed intervals, such as every five frames, or intervals of variable frame length dynamically computed based on an observed rate of movement in a given video.

The trajectory identification module 315 represents the identified trajectories by constructing a trajectory repository 350 comprising a set of tuples p=<r, v, t, l, f> representing specific patches p over time. In this embodiment, r represents the unique identifier of an image region to which the patches correspond, v represents the unique identifier of the video in which the image region is present, t represents a temporal indicator of a time within the video v at which a patch was identified for the corresponding region r (e.g., a number identifying a frame or other time unit), l represents a region within the frame corresponding to t at which the patch is located (e.g., an x, y coordinate if the region is a single point, or two such coordinates defining a bounding rectangle if the region is a two-dimensional area representing an object, or list (or a reference to a list) of pixels corresponding to an arbitrarily shaped region in the frame), and f represents the feature vector extracted from the patch by the feature extraction module 310. Each trajectory has its own unique identifier t-id. A particular trajectory for a specific region $r_1$ is then represented by the set of all patch tuples where $r=r_1$. Further, since each patch corresponds to a single trajectory, each patch p may additional be associated with the trajectory t-id to which it corresponds. The trajectories need not be represented in the manner described above, but may be represented in different fashions in different embodiments, as would be known to one of skill in the art.

A particular trajectory need not be present throughout the entire duration of the video in which it is located. For example, in the case of a trajectory representing the eye of a particular human, the trajectory exists only for the contiguous portion of the video during which that human is shown within the video and during which the human's eye is visible.

It is appreciated that the trajectory repository 350 may describe a very large number (e.g., millions) of distinct trajectories existing in different videos and present during distinct portions of those videos.

In one embodiment, the motion manifold module 119 further comprises a graph creation module 320 that represents the data of the trajectory repository 350 in the form of a cluster graph 361 that more explicitly represents the visual transitions between the different patches of a given trajectory. Each node in the graph represents a cluster of similar feature vectors f, each feature vector being associated with an individual patch. The graph creation module 320 clusters the feature vectors f of the patches according to visual similarity using clustering algorithms such as k-means clustering or connectivity-based clustering. Each cluster is a node in the graph thus represents patches that have very similar appearances, regardless of the particular trajectory to which they belong. Thus, one particular cluster might represent regions corresponding to an open eye from any number of different trajectories and videos, while another cluster might represent regions corresponding to a closed eye, again from any number of different trajectories and videos.

The graph creation module 320 next identifies whether different patches from different cluster nodes co-occur on the same trajectory—i.e., represent different visual states of the same semantic region—and forms edges between the nodes in the graph 361 to reflect those visual transitions. For example, in one embodiment the graph creation module 320 associates with each cluster node a set of the unique trajectories t-id corresponding to the patches in the cluster. The graph creation module then examines each cluster $c_i$, and for each associated trajectory t-id$_i$ identifies each other cluster $c_j$ also having t-id$_i$ in its set of associated trajectories. Thus, if the data in the trajectory repository 350 indicate that a particular cluster $c_1$ (corresponding to open eyes) is associated with a particular trajectory t-id$_1$, and that a different cluster $c_2$ (corresponding to closed eyes) is also associated with trajectory t-id$_1$, the graph creation module 320 could create an edge between the cluster nodes $c_1$ and $c_2$. In this example, the edge reflects the fact that both open eyes and closed eyes, though different in visual appearance are both representative of the same logical object: a human eye. Alternatively, the graph creation module 320 could create edges between cluster nodes only where the patches corresponding to those nodes have been observed to co-occur in trajectories with sufficient frequency, such as a particular threshold number of times, or a particular threshold percentage of the time.

In one embodiment, the motion manifold module 119 further comprises a matrix creation module 325 that represents the cluster graph 361 as a cluster matrix 362 that can be more efficiently applied when comparing the semantic similarity of two different patches. Specifically, the cluster matrix 362 is a symmetric N×N matrix, where N is the number of distinct cluster nodes in the graph 361. Each element in the matrix has a value representing some degree of similarity (or equivalently, difference) between the patches of the cluster nodes corresponding to the row and column of the value. For example, the value could express an unweighted shortest path distance in the graph 361 between the corresponding nodes representing a degree of difference between the patches of the cluster nodes. Alternatively, values representing differences can be reformulated to express similarities, with greater values representing greater degrees of similarity. In one embodiment, the cluster matrix 362 can be created directly from the cluster nodes, without the creation of the cluster graph 361.

Figure 4A:
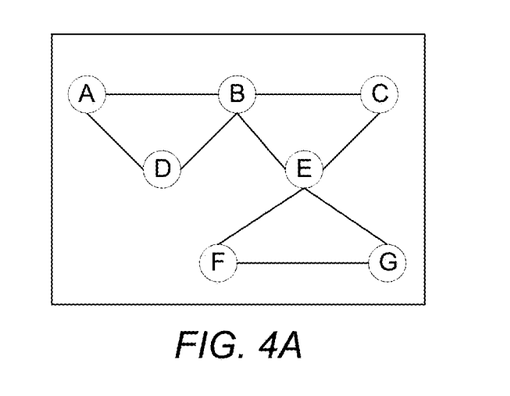
FIGS. 4A and 4B respectively illustrate an example cluster graph and a corresponding cluster matrix.
Figure 4B:
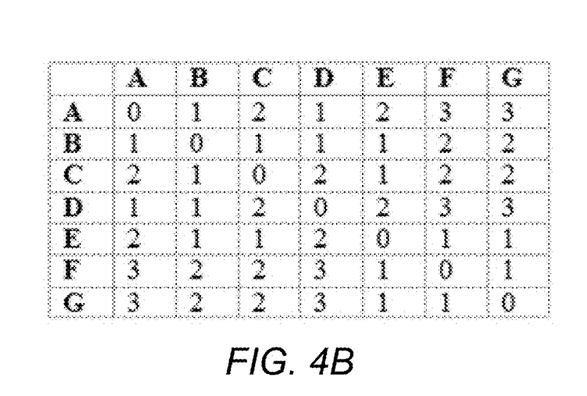

As one simple example of a relationship between the cluster graph 361 and the cluster matrix 362, assume that the graph has seven cluster nodes A-G representing seven clusters of visually similar patch feature vectors, arranged as depicted in FIG. 3A. The matrix creation module 325 could create a corresponding cluster matrix 362 as in FIG. 3B, where the matrix values represent shortest path distances (e.g., number of edges) between corresponding nodes, such as a distance of 3 between cluster nodes A and G. In the example of FIGS. 4A and 4B, the edges are assumed to have a value or cost of 1; however, the edges can be weighted instead, using (for example) the number or percentage of matching trajectories between the connected clusters to express a degree of similarity.

It is appreciated that the motion manifold data structure 360 could be implemented in different manners in different embodiments, and that the creation of both the cluster graph 361 and the cluster matrix 362 is merely one way to do so. For example, the motion manifold data structure 360 could be implemented by directly creating the cluster matrix 362, without first pre-creating the cluster graph 362. Further, the cluster matrix 362—if used—may be represented in different ways, such as a vector of rows or columns.

Thus, modules 305-325 of the motion manifold module 119 analyze the video 117 of the video repository 116 and create the motion manifold data structure 360 that captures the way in which the same logical object can visually vary over time. It remains to apply the motion manifold data structure 360 to quantify semantic similarities of visual elements from images or videos, including those new videos not already within the video repository 116, and hence not previously analyzed as part of the actions of the modules 305-325.

Thus, the motion manifold module 119 further comprises a similarity determination module 330 that quantifies the semantic similarity between different visual elements, such as individual patches of an image or video, images as a whole, and/or videos or video segments. The images or videos of which the visual elements are a part need not have been previously analyzed as part of the actions of the modules 305-325.

The fundamental type of comparison performed by the similarity determination module 330 is the comparison of two patches—or, more precisely, their corresponding feature vectors—to quantify the probability that they represent, or are part of, the same semantic region of an image. More complex forms of comparisons, such as comparisons of images, or of video segments, may in turn be accomplished using patch comparisons, as described below.

To continue prior examples, in the case of patch comparisons there should be a strong degree of semantic similarity—if not visual similarity—between a patch corresponding to an open eye and a patch corresponding to a closed eye, given that they both correspond to the same semantic object (namely, an eye). That is, even though the patches may be visually quite dissimilar, they nonetheless are part of the same trajectory and hence represent the same semantic region.

Specifically, in one embodiment the similarity determination module 330 calculates the similarity between a first patch represented by its corresponding feature vector x and a second patch represented by its corresponding feature vector y as a weighted sum of the values in the cluster matrix 362. Because the patches may come from visual elements not in the video repository 116—or at least, not yet in the video repository at the time that the motion manifold 360 was created—they may not correspond perfectly with any of the patches already stored in the patch clusters of the cluster graph 361. (In contrast, if x corresponded perfectly to a cluster $c_1$ and y corresponded perfectly to a cluster $c_2$, the degree of similarity between x and y could be computed simply by reading the value at row $c_1$ and column $c_2$—or equivalently, row $c_2$ and column $c_1$, since the matrix 362 is symmetric.) Hence, instead of reading only a single value of the matrix 362, a weighted sum of all the matrix values is computed, reflecting the fact that x and y may correspond to some degree to each of the cluster pairs represented in the matrix.

More specifically, the feature vector x for the first patch is visually compared to each of the cluster nodes of the cluster graph 361 to determine, for each cluster node $c_i$, a degree of similarity $\psi_i$ between x and $c_i$. A degree of similarity $\omega_i$ is likewise determined between y and each cluster node $c_i$. Then, the value of the matrix 362 at column $c_i$ and row $c_j$ is weighted by the product of $\psi_i$ and $\omega_i$, representing the fact that the matrix value for a particular pair of clusters is only applicable to the semantic of x and y to the degree that x and y are similar to the respective clusters of the pair. These operations are more succinctly expressed by the equation:

$$\text{Sim}(x, y) = \Sigma_{i,j}[(M_{ij}) * (\psi_i \omega_j)]$$

where Sim( ) is the similarity function, M is the matrix 362, i and j are the row and column indices of the matrix, $\psi_i$ is the degree of representativeness of x to cluster node i, and $\omega_j$ is the degree of representativeness of y to cluster node j. (Greater sums represent greater degrees of similarity, and hence if the values of the cluster matrix 362 represent degrees of difference, they are first converted to be expressed as corresponding degrees of similarity before the similarity determination module 330 computes the weighted sum.)

As a more specific example, referring back to FIG. 4B, assume that cluster node A is a cluster of patches representing open eyes, and cluster node B is a cluster of patches representing closed eyes. If x were the feature vector of an open eye perfectly representative of cluster node A, and y were the feature vector of a closed eye perfectly representative of cluster node B, then the precise similarity of x and y could be determined simply by reading the matrix entry at column A, row B (or equivalently, column B, row A). However, since the representativeness of x for cluster node A, and of y for cluster node B, is likely to be less than perfect, similarities between x and A (and between x all the other cluster nodes) and between y and B (and between y and all the other cluster nodes) are computed, and the product of the x-similarity, the y-similarity, and the value of the corresponding matrix element, are computed for every matrix element, and the results summed. Thus, for example, the weighted sum corresponding to the first row of the matrix A of FIG. 4B would be computed as $$(M_{A,A} * \text{Sim}(x,A) * \text{Sim}(y,A)) + (M_{A,B} * \text{Sim}(x,A) * \text{Sim}(y,B)) + (M_{A,C} * \text{Sim}(x,A) * \text{Sim}(y,C)) + (M_{A,D} * \text{Sim}(x,A) * \text{Sim}(y,D)) + (M_{A,E} * \text{Sim}(x,A) * \text{Sim}(y,E)) + (M_{A,F} * \text{Sim}(x,A) * \text{Sim}(y,F)) + (M_{A,G} * \text{Sim}(x,A) * \text{Sim}(y,G))$$

where $M_{i,j}$ represents the matrix value at row i (corresponding to cluster $c_i$) and column j (corresponding to cluster $c_j$), and Sim(v, Cl) represents a degree of visual similarity between a vector v and a cluster Cl. The similarities for the other rows would be calculated in the same manner and likewise added to the total similarity value.

In one embodiment, the degree of visual similarity of a feature vector to a cluster node is computed by comparing the feature vector to the centroid of the feature vectors in the cluster, which is also a vector. For example, to compute the similarity, the dot product of the cluster centroid vector and the feature vector can be computed and the sum normalized appropriately.

Given the ability to calculate degrees of semantic similarity for patches, as described above, the similarity determination module 330 can determine higher-level types of semantic similarity in terms of patch similarities. One such type of higher-level semantic similarity is that between two images. For example, in one embodiment static images $I_1$ and $I_2$ are considered semantically similar to the degree that they contain similar patches. Thus, if $I_1$ has m patches, and $I_2$ has n patches, then the similarity determination module 330 forms the Cartesian product of patches from $I_1$ and $I_2$ and performs m*n patch comparisons between pairs of patches. The precise image similarity computation using the patch similarity computations may vary in different embodiments, as would be known to one of skill in the art. For example, the images may be said to be similar if they contain at least some minimum number of patches that have at least a threshold degree of patch similarity. Or a real-valued similarity measure can be computed by summing the patch similarity measures of all patch pairs and normalizing by dividing by the number of patch pairs.

In like fashion, the similarity determination module 330 can determine the semantic similarity between video segments—or videos, which are in essence a video segment consisting of the entire video—in terms of patch similarities. In one embodiment, the similarity determination module 330 identifies, for both of the video segments, all the patch trajectories partially or entirely existing within the video segment. Then each trajectory of the first video is compared to each trajectory of the second video, and the degree of semantic similarity between the video segments is determined based on the semantic similarities between the trajectories. The degree of semantic similarity between two trajectories may be defined in different manners in different embodiments. For example, each pair of patches—one from the first trajectory, and one from the second trajectory—may have its semantic similarity computed. The semantic similarity of the trajectories may then be defined in terms of number of patch pairs that match (i.e., that have at least some threshold level of similarity), with the first match having the greatest positive effect on the trajectory similarity, and each subsequent match having a progressively lower positive impact.

The similarity determination module 330 can determine semantic similarities between different video or image types—such as between an image and a video segment—in an analogous fashion. For example, the semantic similarity between an image and a video segment can be determined by determining the semantic similarities of the image to each of the patch trajectories partially or entirely contained within the video segment. In turn, the semantic similarity of an image and a patch trajectory can be defined based on the semantic similarities of all patch pairs from the Cartesian product of patches in the image and patches in the patch trajectory, in a manner similar to the computation of semantic similarity of two patch trajectories.

Data Flow

Figure 5A:
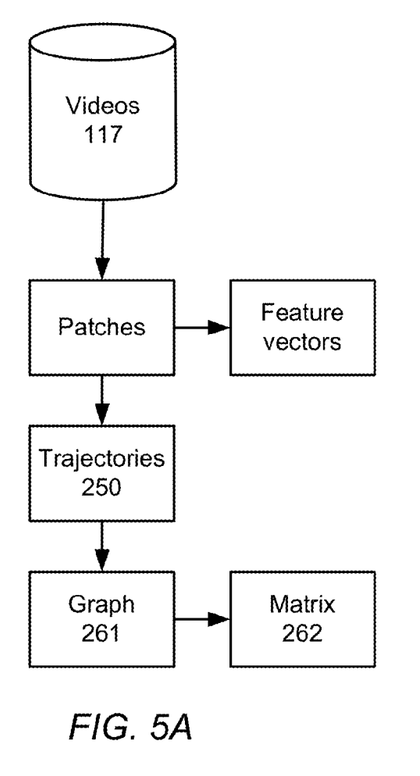
FIGS. 5A and 5B are data flow diagrams representing the relationships and derivations of the various types of data analyzed, produced, and/or applied by the motion manifold module, according to one embodiment.

FIGS. 4A and 4B are data flow diagrams representing the relationships and derivations of the various types of data analyzed and/or produced by the motion manifold module 119 of FIG. 2, according to one embodiment. FIG. 5A depicts the creation of the cluster graph 361 and cluster matrix 362 that conceptually represent the motion manifold data structure 360, and FIG. 5B depicts the application of the motion manifold to compute the similarity measure of two patches.

Specifically, in FIG. 5A the videos 117 are analyzed, and patches extracted from them corresponding to regions of semantic interest (e.g., points of discontinuity, or individual objects), as described above with respect to the patch identification module 305. Feature vectors corresponding to the identified patches are extracted, as described above with respect to the feature extraction module 310. The movement and visual change of the regions is tracked across the video, thereby resulting in a set of trajectories, each trajectory including the various patches for the region. These actions are described in more detail above with respect to the trajectory identification module 315. A motion manifold data structure 360 is then constructed, the motion manifold indicating the different visual representation that a region of semantic interest can have over time, such as a region corresponding to an eye having both an open and a closed visual representation. In one embodiment, the motion manifold can be implemented using the cluster graph 361 and/or the cluster matrix 362, as described above with respect to the graph creation module 320 and the matrix creation module 325.

Figure 5B:
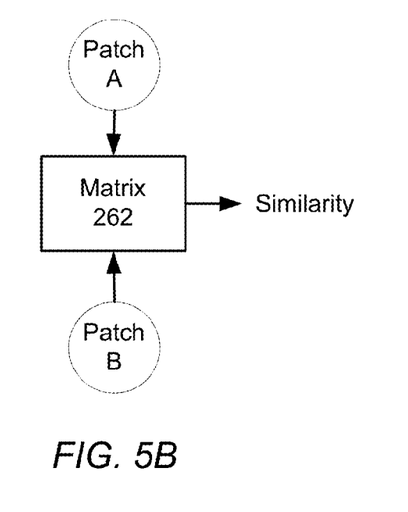

As further illustrated in FIG. 5B, the motion manifold 360 can then be applied to quantify the semantic similarities—and not merely visual similarities—of different patches, as described above with respect to the similarity determination module. The ability to quantify semantic similarity of patches may then be leveraged to identify higher-level forms of semantic similarity, such as that between images or between video segments.

Thus, the motion manifold produced by an embodiment carrying out the flow of operations depicted in FIG. 4 can be used to quantify the similarity of different portions of images or videos, not merely on a visual level, but also on a semantic level. Thus, for example, the use of the motion manifold could allow the recognition that an image of a closed eye and of an open eye are semantically similar—even though they are visually very different—since they tend to follow each other over time within videos.

Applications

Semantic similarity determination can be applied in a broad range of video or image contexts, such as the following.

Search: The similarity determination module 330 can determine the semantic similarities of images in an image repository, video segments from the videos 117 in the video repository 116, or the like, in a preprocessing phase. Then, when a user enters a query for a particular concept, and the search engine identifies a set of search results, the search results can be augmented with other images or videos having a sufficiently high degree of semantic similarity to those images or videos already in the search result set.

Additionally, image or video searches can be made more fine-grained by including in the search results specific video segments corresponding to semantically similar patch trajectories. For example, when searching for a particular concept, a set of patch trajectories most similar to the image search results for that concept can be identified, and the video segments corresponding to those trajectories can accordingly be included in the search results, thus locating the specific relevant portions of videos.

The present disclosure has been described in particular detail with respect to one possible embodiment. Those of skill in the art will appreciate that the disclosure may be practiced in other embodiments. First, the particular naming of the components and variables, capitalization of terms, the attributes, data structures, or any other programming or structural aspect is not mandatory or significant, and the mechanisms that implement the disclosure or its features may have different names, formats, or protocols. Also, the particular division of functionality between the various system components described herein is merely for the sake of example, and not mandatory; functions performed by a single system component may instead be performed by multiple components, and functions performed by multiple components may instead performed by a single component.

Some portions of above description present the features of the present disclosure in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality.

Unless specifically stated otherwise as apparent from the above discussion, it is appreciated that throughout the description, discussions utilizing terms such as "determine" refer to the action and processes of a computer system, or similar electronic computing device, that manipulates and transforms data represented as physical (electronic) quantities within the computer system memories or registers or other such information storage, transmission or display devices.

Certain aspects of the present disclosure include process steps and instructions described herein in the form of an algorithm. It should be noted that the process steps and instructions of the present disclosure could be embodied in software, firmware or hardware, and when embodied in software, could be downloaded to reside on and be operated from different platforms used by real time network operating systems.

The present disclosure also relates to an apparatus for performing the operations herein. This apparatus may be specially constructed for the required purposes, or it may comprise a general-purpose computer selectively activated or reconfigured by a computer program stored on a computer readable medium that can be accessed by the computer. Such a computer program may be stored in a non-transitory computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of computer-readable storage medium suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will be apparent to those of skill in the art, along with equivalent variations. In addition, the present disclosure is not described with reference to any particular programming language. It is appreciated that a variety of programming languages may be used to implement the teachings of the present disclosure as described herein, and any references to specific languages are provided for disclosure of enablement and best mode of the present disclosure.

The present disclosure is well suited to a wide variety of computer network systems over numerous topologies. Within this field, the configuration and management of large networks comprise storage devices and computers that are communicatively coupled to dissimilar computers and storage devices over a network, such as the Internet.

Finally, it should be noted that the language used in the specification has been principally selected for readability and instructional purposes, and may not have been selected to delineate or circumscribe the inventive subject matter. Accordingly, the disclosure of the present disclosure is intended to be illustrative, but not limiting, of the scope of the disclosure, which is set forth in the following claims.

What is claimed is:

1. A computer-implemented method of creating a motion manifold for determining a similarity between two image patches, the method comprising:

identifying semantic regions of videos of a set of digital videos;

for each identified semantic region, identifying patch trajectories by identifying patches corresponding to the semantic region and tracking the patches across consecutive frames of the videos, a patch corresponding to the semantic region including image data for the semantic region;

creating a motion manifold indicating different visual representations of a given semantic region by using the patch trajectories identified for the given semantic region, the creating of the motion manifold comprising:

clustering the patches into patch clusters according to visual similarity of the patches, each patch cluster representing a subset of the patches having similar visual appearances, the patches of the subset being from one or more patch trajectories, and determining degrees of semantic similarity between pairs of the patch clusters based on degrees to which a first cluster of the pair and a second cluster of the pair have patches from a same patch trajectory; and storing the motion manifold.

2. The computer-implemented method of claim 1, wherein the semantic regions consist of individual image points.

3. The computer-implemented method of claim 1, wherein the semantic regions consist of individual semantic objects defined by points of visual discontinuity, and wherein the patch for a semantic object comprises pixel data for a region bounded by the points.

4. The computer-implemented method of claim 1, wherein each identified patch trajectory is associated with one of the semantic regions and comprises a set of the tracked patches for the semantic region.

5. The computer-implemented method of claim 4, further comprising representing an identified patch trajectory with a set of associated <r, v, t, 1>tuples representing patches, r representing an identifier of the associated semantic region, v representing an identifier of a video in which the associated semantic region is present, t representing a temporal indicator of a time within the video at which a patch corresponding to the semantic region was identified, and 1 representing a region within a frame of the video in which the semantic region is located at the time.

6. The computer-implemented method of claim 1, wherein creating the motion manifold comprises:

forming a cluster graph by creating edges between cluster pairs based on the determined degrees of semantic similarity between the pairs of the patch clusters.

7. The computer-implemented method of claim 1, wherein creating the motion manifold comprises:

forming a cluster matrix, wherein each matrix element is based on the determined degree of semantic similarity between a pair of the patch clusters to which the matrix element corresponds.

8. The computer-implemented method of claim 1, further comprising forming a cluster graph by creating edges between cluster pairs based on the determined degrees of semantic similarity between the pairs of the patch clusters, and forming a square cluster matrix having matrix elements formed based on the edges of the cluster graph.

9. The computer-implemented method of claim 1, further comprising:

determining a degree of semantic similarity between a first patch from a first visual element and a second patch from a second visual element using the motion manifold.

10. The computer-implemented method of claim 9, further comprising:

determining a degree of semantic similarity between the first visual element and the second visual element using the motion manifold, wherein the first visual element is one of an image and a video segment.

11. A non-transitory computer-readable storage medium having executable computer program instructions embodied therein for creating a motion manifold for determining a similarity between two image patches, actions of the computer program instructions comprising:

identifying semantic regions of videos of a set of videos;

for each semantic region, identifying patch trajectories by identifying patches corresponding to the semantic region and tracking the patches across consecutive frames of the videos, a patch corresponding to the semantic region including image data for the semantic region;

creating a motion manifold indicating different visual representations of a given semantic region by using the patch trajectories identified for the given semantic region, the creating of the motion manifold comprising:

clustering the patches into patch clusters according to visual similarity of the patches, each patch cluster representing a subset of the patches having similar visual appearances, the patches of the subset being from one or more patch trajectories, and determining degrees of semantic similarity between pairs of the patch clusters based on degrees to which a first cluster of the pair and a second cluster of the pair have patches from a same patch trajectory; and storing the motion manifold.

12. The non-transitory computer-readable storage medium of claim 11, wherein each identified patch trajectory is associated with one of the semantic regions and comprises a set of the tracked patches for the semantic region.

13. The non-transitory computer-readable storage medium of claim 12, the actions further comprising representing an identified patch trajectory with a set of associated <r, v, t, 1>tuples representing patches, r representing an identifier of the associated semantic region, v representing an identifier of a video in which the associated semantic region is present, t representing a temporal indicator of a time within the video at which a patch corresponding to the semantic region was identified, and 1 representing a region within a frame of the video in which the semantic region is located at the time.

14. The non-transitory computer-readable storage medium of claim 11, wherein creating the motion manifold comprises:

forming a cluster graph by creating edges between cluster pairs based on the determined degrees of semantic similarity between the pairs of the patch clusters.

15. The non-transitory computer-readable storage medium of claim 11, wherein creating the motion manifold comprises:

forming a cluster matrix, wherein each matrix element is based on the determined degree of semantic similarity between a pair of the patch clusters to which the matrix element corresponds.

16. The non-transitory computer-readable storage medium of claim 11, the actions further comprising:

determining a degree of semantic similarity between a first patch from a first visual element and a second patch from a second visual element using the motion manifold.

17. A computer system for creating a motion manifold for determining a similarity between two image patches, the system comprising:

a computer processor; and a computer-readable storage medium having executable computer program instructions embodied therein that when executed by the computer processor perform actions comprising:

identifying semantic regions of videos of a set of digital videos;

for each semantic region, identifying patch trajectories by identifying patches corresponding to the semantic region and tracking the patches across consecutive frames of the videos, a patch corresponding to the semantic region including image data for the semantic region;

creating a motion manifold indicating different visual representations of a given semantic region by using the patch trajectories identified for the given semantic region, the creating of the motion manifold comprising:

clustering the patches into patch clusters according to visual similarity of the patches, each patch cluster representing a subset of the patches having similar visual appearances, the patches of the subset being from one or more patch trajectories, and determining degrees of semantic similarity between pairs of the patch clusters based on degrees to which a first cluster of the pair and a second cluster of the pair have patches from a same patch trajectory; and storing the motion manifold.

18. The computer system of claim 17, wherein each identified patch trajectory is associated with one of the semantic regions and comprises a set of the tracked patches for the semantic region.

19. The computer system of claim 18, the actions further comprising representing an identified patch trajectory with a set of associated <r, v, t, 1>tuples representing patches, r representing an identifier of the associated semantic region, v representing an identifier of a video in which the associated semantic region is present, t representing a temporal indicator of a time within the video at which a patch corresponding to the semantic region was identified, and 1 representing a region within a frame of the video in which the semantic region is located at the time.

20. The computer system of claim 17, wherein creating the motion manifold comprises:

forming a cluster graph by creating edges between cluster pairs based on the determined degrees of semantic similarity between the pairs of the patch clusters.

21. The computer system of claim 17, wherein creating the motion manifold comprises:

forming a cluster matrix, wherein each matrix element is based on the determined degree of semantic similarity between a pair of the patch clusters to which the matrix element corresponds.

22. The computer system of claim 17, the actions further comprising:

determining a degree of semantic similarity between a first patch from a first visual element and a second patch from a second visual element using the motion manifold.

23. A computer-implemented method of determining semantic similarities among videos comprising:

for each video of a set of videos:
identifying semantic regions of the video;
for each identified semantic region, identifying patch trajectories by identifying patches corresponding to the semantic region and tracking the patches corresponding the semantic regions across consecutive frames of the video, a patch corresponding to the semantic region including image data for the semantic region;
associating the tracked patches for a given semantic region with a unique identifier for the given semantic region;
aggregating the identified patches across the videos;

forming patch clusters by clustering the aggregated patches according to visual appearance, each patch cluster representing a subset of the patches having similar visual appearances, the patches of the subset being from one or more patch trajectories;

forming a cluster graph of nodes connected by edges reflecting visual transitions between the nodes, each node uniquely corresponding to one of the patch clusters, the forming the cluster graph comprising creating edges between pairs of nodes responsive to the patch clusters that correspond to the nodes of the pair having at least a threshold degree of patch co-occurrence within at least one of the identified patch trajectories;

forming a cluster matrix to represent the cluster graph, each element of the matrix having a value quantifying a degree of semantic similarity between a first one of the patch clusters and a second one of the patch clusters based on the created edges; and storing the cluster matrix, each element of the cluster matrix corresponding to an element row and an element column.

24. The computer-implemented method of claim 23, further comprising:

determining a degree of semantic similarity between a first patch from a first visual element and a second patch from a second visual element using the cluster matrix, the set of videos comprising the first and second visual elements, the determining the degree of semantic similarity comprising:

computing, for each element of the cluster matrix, a first degree of similarity between the first patch and a patch cluster corresponding to the element row of the element in the cluster matrix, and a second degree of similarity between the second patch and a patch cluster corresponding to the element column of the element in the cluster matrix; and computing, for the element of the cluster matrix, a weight as a product of the first degree of the similarity and the second degree of similarity; and applying the weights to values of the elements of the cluster matrix to compute the degree of semantic similarity as a weighted sum of the values of the elements of the cluster matrix.

* * * * *